Patented Feb. 20, 1934

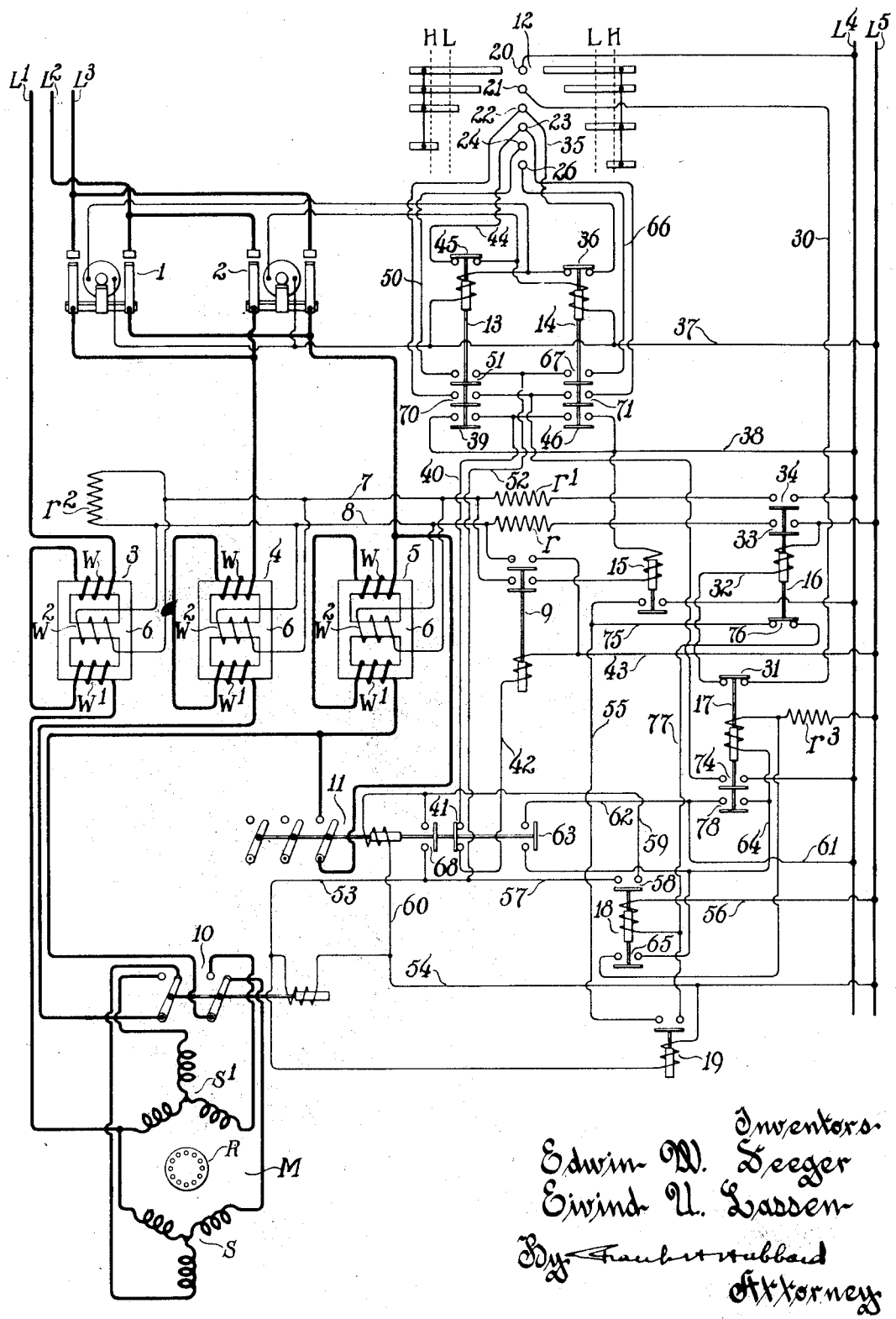

1,947,677

UNITED STATES PATENT OFFICE 1,947,677

MOTOR CONTROLLER

Edwin W. Seeger, Wauwatosa, and Eivind U. Lassen, West Allis, Wis., assignors to Cutler-Hammer, Inc., Milwaukee, Wis., a corporation of Delaware Application July 15, 1932. Serial No. 622,664

14 Claims. (Cl. 172—179)

This invention relates to improvements in controllers for multi-speed alternating current motors, controllers embodying the invention being particularly advantageous for control of elevator motors.

More specifically the invention relates to improvements in the type of controller disclosed in the Seeger Patent No. 1,848,847, March 8, 1932, wherein for smooth and quiet acceleration and deceleration the motor is controlled through the medium of reactors having direct current coils to produce a varying effect on such reactors subject to time control inherent in the building up of the magnetic flux of the direct current coils.

In the specific form of control shown in the aforementioned patent the reactors are used only for control of the slow speed winding of the motor, and the present invention has among its objects to provide for use of the reactors for control of high and low speed windings.

A further object is to provide for control of the reactors for different reactance values under different conditions.

Various other objects and advantages of the invention will hereinafter appear.

The accompanying drawing illustrates diagrammatically an embodiment of the invention, which for simplicity of illustration has omitted therefrom numerous refinements which ordinarily would be employed in practice. It is to be understood that the embodiment illustrated is susceptible of various modifications without departing from the scope of the appended claims.

Referring to the accompanying drawing there is illustrated a motor M of a type commonly used in elevator service, said motor comprising a squirrel cage rotor R, a three phase slow speed stator winding S, and a three phase high speed stator winding $S^1$. The windings S and $S^1$ are supplied with current from a three phase circuit comprising lines $L^1$, $L^2$, $L^3$.

Each of the motor windings S and $S^1$ has one terminal permanently connected to line $L^1$ while electromagnetic reversing switches 1 and 2 are provided to act in conjunction with a selector switch hereinafter described to connect the remaining terminals of either winding S or winding $S^1$ to lines $L^2$ and $L^3$ interchangeably. It is, of course, to be understood that the electromagnetic switches 1 and 2 which are shown as of the double pole type might be provided with an additional pole to make and break circuit between line $L^1$ and the motor windings S and $S^1$.

For control of the motor three reactors 3, 4 and 5 are provided, one for each phase of the stator circuit. The three reactors are of like construction, each comprising a magnet frame 6 preferably of the form illustrated, with coils W and $W^1$ wound on the end portions and a coil $W^2$ wound on the central portion. The coils W and $W^1$ of each reactor are connected in series, such coils of reactor 3 being shown with permanent connections to line $L^1$ and to one terminal of each of the motor windings S and $S^1$. The coils $W^2$ constitute the aforementioned direct current coils of the reactors, the same being connected in parallel across a circuit 7—8 supplied from a direct current source comprising lines $L^4$ and $L^5$. This type of reactor is well known, and as will be understood its reactance value decreases as the flux of its direct current coil increases, such increase in flux being inherently delayed and gradual. For control of the reactors resistances $r$ and $r^1$ are provided in the circuit 7—8, said resistances being adapted to be short-circuited by an electro-responsive switch 9. Across the circuit 7—8 there is connected a resistance $r^2$ providing a discharge path for the coils $W^2$.

An electroresponsive selector switch 10 provides for including in circuit the motor windings S and $S^1$ selectively, and said switch normally completes circuit between the reversing switches 1 and 2 and the slow speed winding S including in different phases of the circuit of said winding S the coils W and $W^1$ of reactors 4 and 5, respectively. On the other hand, when the selector switch 10 is energized it disconnects two terminals of the slow speed winding S and establishes connections between two terminals of the high speed winding $S^1$ and the reversing switches 1 and 2 through the coils W and $W^1$ of reactors 4 and 5.

An electroresponsive switch 11 provides for short-circuiting the coils W and $W^1$ of reactors 3, 4 and 5, when said switch is energized. This switch is of the triple pole type having separate sets of contacts to establish short-circuits for the coils W and $W^1$ of the reactors 3, 4 and 5, respectively, the short-circuit established by one of said sets of contacts being shown, and the short-circuits established by two of said sets of contacts being omitted for simplicity of illustration.

The further elements of the controller illustrated comprise a master switch 12, direction relays 13 and 14, a relay 15 having a winding to be connected by relay 9 in series with the D. C. windings $W^2$ and relays 16, 17, 18 and 19, all of said relays as well as switches 1, 2, 10 and 11 having their energizing circuits supplied from the direct current lines L⁴—L⁵.

Considering the functions of the controller, when the master switch 12 is moved in either direction to low speed (L) position it effects energization of one of the reversing switches to start the motor by exciting the slow speed winding S. The winding S is first subjected to a given influence of the reactors 3, 4 and 5 as determined by the direct current windings W² which are connected to lines L⁴, L⁵ through regulating resistances $r$, $r^1$. Then the resistances $r$, $r^1$ are short-circuited and after an inherent time delay the effect of the reactors is reduced to a minimum determined by the design of said reactor. Thus it will be observed that provision is made for gradual and quiet acceleration of the motor to a given slow speed. As will appear, the master switch is so designed as to effect completion of the circuit of the windings W² of the reactors through resistances $r$, $r^1$, thereby providing for a reactance value somewhat less than maximum, prior to effecting completion of the motor circuit for starting.

Considering the circuit connections which afford the control thus far described, the same are as follows. Bridging of the master switch contacts 20 and 21 either by the corresponding right hand segments or the corresponding left hand segments, completes circuit from line L⁴ through said bridged contacts 20 and 21 by conductor 30, through normally closed contacts 31 of relay 17, by conductor 32 through the winding of relay 16 to line L⁵. Thus relay 16 is caused to respond to complete through its contacts 33 and 34 the circuit 7—8 to which the reactor windings W² are connected. Bridging of the master switch contacts 20 and 22 by the corresponding left hand segments completes circuit from line L⁴ through bridged contacts 20 and 22 by conductor 35 through normally closed contacts 36 of relay 14, to and through the windings of switch 1 and relay 13 in parallel, by conductor 37 to line L⁵. Thus the switch 1 is energized for connection of the slow speed winding S of the motor to the line, the selector switch 10 being deenergized to occupy the position shown, while relay 13 is also energized with the following results. Circuit is completed from line L⁴ by conductor 38 through contacts 39 of relay 13, by conductor 40, through normally closed auxiliary contacts 41 of switch 11, by conductor 42 through the winding of relay 9, by conductor 43 to line L⁵. Thus relay 9 is energized to short-circuit resistances $r$ and $r^1$ in circuit with the direct current windings W² of the reactors. On the other hand, when the master switch contacts 20—23 are bridged by the corresponding right hand segments of the drum circuit is completed from line L⁴ through said bridged contacts 20—23, by conductor 44, through normally closed contacts 45 of relay 13, to and through the windings of switch 2 and relay 14 in parallel, by conductor 37 to line L⁵. Thus such operation of the master switch effects reverse operation of the motor and energizes relay 14 instead of relay 13, and relay 14 through its contacts 46 which parallel contacts 39 of relay 13 energizes relay 9, with the result described.

If now the master switch is moved in either direction to its high speed (H) position it will effect disconnection of the slow speed winding S and connection of the high speed winding S¹ to the line with the reactors 3, 4 and 5 effective to some degree according to the design thereof, the D. C. windings W² remaining in circuit with the resistances $r$ and $r^1$ excluded. On the other hand, connection of the high speed winding in circuit is closely followed by automatic operation of the controller to exclude from circuit the reactors 3, 4 and 5 and to disconnect the direct current windings W².

Considering the connections which afford the further control just described, the same are as follows. Bridging of the master switch contacts 20 and 24 by the corresponding left hand drum segments establishes circuit from line L⁴ through the bridged contacts 20 and 24, by conductor 50, through contacts 51 of relay 13, by conductors 52 and 53, through the winding of selector switch 10, by conductor 54 to line L⁵. Thus the selector switch 10 is operated to disconnect the slow speed winding S and to connect the high speed winding S¹ as above set forth. Also a circuit is established from conductor 53 through the winding of relay 19 to conductor 54 which parallel said winding with the winding of switch 10, causing said relay 19 to respond. Relay 19 upon responding completes circuit from line L⁴ through the contacts of relay 15 when closed, by conductor 55 through the contacts of relay 19, to and through the winding of relay 18 by conductor 56 to line L⁵, relay 15 being adjusted for response during slow speed operation of the motor, or in any event when the current in the circuit of windings W² has increased to a given value. Thus relay 18 is caused to respond to complete circuit from conductor 53 which feeds the winding of switch 10, by conductor 57 through the contacts 58 of relay 18, by conductor 59 to and through the operating winding of switch 11, by conductor 60 and 54 to line L⁵. Switch 11 thereupon responds and as aforestated this switch in responding short-circuits the winding W and W¹ of the reactors 3, 4 and 5, thereby reducing the impedance in the motor circuit. Also the switch 11 in responding disengages its auxiliary contacts 41, thereby deenergizing relay 9 which in turn interrupts the energizing circuit of relay 15. Upon opening of relay 15 relay 18 is deenergized and when this relay drops out relay 17 responds. The relay 17 has an energizing circuit extending from line L⁴ by conductors 61 and 62, through auxiliary contacts 63 of the now closed switch 11, by conductor 64 through the winding of relay 17 and resistance $r^3$ to line L⁵, but with the relay 18 energized the contacts 65 of the latter short-circuit the winding of relay 17 whereby response of the relay 17 is delayed pending drop out of relay 18. Relay 17 upon responding drops out relay 16 by disengagement of contacts 31. Thus the D. C. coils of the reactors are completely disconnected from circuit as aforedescribed, and the same results are accomplished by reverse operation of the master switch to bridge its contacts 20 and 26. In this event circuit is closed from line L⁴ through bridged contacts 20 and 26 by conductor 66 through contacts 67 of relay 14 to conductor 52, which as heretofore explained feeds the winding of selector switch 10 and the winding of relay 19, causing said switches to respond and effect the further circuit commutations heretofore explained. When the relay 18 drops out as heretofore explained it tends to deenergize the switch 11, but said switch upon responding establishes through its auxiliary contacts 68 a maintaining circuit paralleling the contacts 58 of relay 18 whereby switch 11 is maintained energized pending movement of the master switch out of high speed position.

When the master switch is thrown from off position to its high speed position without hesitating at the low speed point, the high speed winding $S^1$ of the motor is connected in circuit immediately after the direction switch is closed, and in this instance the high speed winding is subjected to the influence of the reactors in the same manner as is the slow speed winding when the master switch is arrested in low speed position. Furthermore the relay 15 functions as aforedescribed subject to a time element dependent upon increase in current in the circuit of the windings $W^2$ of the reactors, to energize the switch 11 to short-circuit the reactors. As will be understood the relay 15 affords a time limit control of the reactor short-circuiting switch 11 and during the interval thus provided the gradual building up of the D. C. flux gradually changes the reactance value to effect acceleration of the motor in an infinite number of infinitely small steps, the final value which is commutated by switch 11 being very low and hardly noticeable as far as the change in speed or torque is concerned.

When the motor is operating at high speed and the master switch is returned to low speed position, the high speed winding $S^1$ is disconnected from circuit, whereas the slow speed winding S is again included in circuit, the short-circuit around the reactors being interrupted and the direct current coils $W^2$ being disconnected from circuit for maximum influence of the reactors, such maximum being properly selected for slow down purposes. However, when the switch 11 is opened to interrupt the short-circuits of the reactors it recloses its contacts 41 to again energize relay 9 which responds to reconnect circuit 7—8 to lines $L^4$—$L^5$ for reenergization of the direct current coils of the reactors subject to the inherent time lag. The D. C. reactor flux gradually builds up, thereby changing the impedance of the reactor coils and gradually increasing the retarding torque of the motor. Thus is obtained a very smooth and gradual dynamic braking action, and if the car switch is left in low speed position the motor continues to run at the corresponding speed with a low value of permanent impedance in series with the slow speed winding.

If now the car switch is moved from low speed position to its off position the direction switches will drop out immediately and stop the motor.

Should the master switch be thrown from high speed position to off position without pause in the low speed position the direction switches will be maintained energized by contacts 70 of relay 13 or contacts 71 of relay 14, and contacts 74 of relay 17. The relay 17 which has contacts 78 establishing for itself a maintaining circuit remains closed during dynamic braking until the current through the D. C. reactor coils is built up sufficiently to energize relay 15, which when responding establishes an energizing circuit for relay 18 extending from line $L^4$ through relay 15, by conductor 75, through contacts 76 of relay 16, by conductor 77 to and through the winding of relay 18 to line $L^5$. Relay 18 in responding short-circuits through its contacts 65 the winding of relay 17. Thus when the relay 15 responds it effects through deenergization of relay 17 interruption of the maintaining circuits of the direction switches, thereby disconnecting the motor from circuit after smooth dynamic braking of the motor.

Since the direction relays 13 and 14 are electrically interlocked as heretofore set forth and the relay 17 maintains the energized direction relay and its corresponding direction switch energized upon movement of the master switch to off position as just described, it will be apparent that the controller likewise provides for gradual slowdown of the motor when subjected to reversals.

What we claim as new and desire to secure by Letters Patent is:

1. The combination with an alternating current motor having a plurality of windings for connection in circuit selectively to afford different speeds, of reactors having direct current windings for varying their reactance value and means to commutate the circuits of said motor windings and the circuits of said reactors for control of said motor by the same reactors in conjunction with said motor windings selectively.

2. The combination with an alternating current motor having a plurality of windings for connection in circuit selectively to afford different speeds, of reactors having direct current windings for varying their reactance value, and means to commutate the circuits of said motor windings and the circuits of said reactors for control of said motor by said reactors in conjunction with said motor windings selectively, said means including resistance and means to connect the direct current windings of said reactors to a source of supply through said resistance preparatory to starting of said motor.

3. The combination with an alternating current motor having a plurality of windings for connection in circuit selectively to afford different speeds, of reactors having direct current windings for varying their reactance value and means to connect said motor windings in circuit progressively, each subject to control by common reactors, said means including means to establish connections for the direct current windings of said reactors preparatory to starting of said motor and to exclude from circuit said reactors inclusive of their direct current windings after acceleration of the motor to a given speed.

4. The combination with an alternating current motor having a plurality of windings for connection in circuit selectively to afford different speeds, of reactors common to said plurality of windings and having direct current windings for varying their reactance value and means to connect said motor windings in circuit progressively to effect starting and acceleration of said motor or to connect only the higher speed winding for starting and acceleration of said motor, said means including means subjecting the first excited motor winding, whether it be the lower speed or higher speed winding, to the influence of said reactors for gradual acceleration of said motor by excitation of the direct current windings of said reactors.

5. The combination with an alternating current motor having a plurality of windings for connection in circuit selectively to afford different speeds, of reactors having direct current windings for varying their reactance value and means to connect said motor windings in circuit progressively subjecting the first excited winding to the influence of said reactors throughout a period wherein the reactance value of the latter is varied by their direct current windings and subjecting the second excited motor winding to the influence of said reactors when at a reduced reactance value and subsequently excluding said reactors from circuit, said means alternatively providing for starting of said motor by excitation of its second mentioned winding and subjection of the latter winding to the influence of said reactors while the latter are under the varying influence of their direct current windings.

6. The combination with an alternating current motor having a plurality of windings for connection in circuit selectively to afford different speeds, of reactors having direct current windings for varying their reactance value and control means for said motor windings and reactors to subject said direct current windings to a given degree of excitation, then to connect in circuit either of said motor windings for starting of said motor and to increase the excitation of said direct current windings for gradual acceleration of said motor, said means further providing for disconnection of the lower speed winding and connection of a higher speed winding after the motor has been accelerated under the influence of the direct current windings of said reactors and for thereafter excluding said reactors from circuit for a given speed of said motor.

7. The combination with an alternating current motor having a plurality of windings for connection in circuit selectively to afford different speeds, of reactors having direct current windings for varying their reactance value and control means for said motor windings and said reactors providing for connection said reactors in circuit with said motor windings selectively, said means including means to exclude said reactors from circuit after acceleration of said motor and to reinclude said reactors at maximum reactance value for slow down of said motor.

8. The combination with an alternating current motor having a plurality of windings for connection in circuit selectively to afford different speeds, of reactors having direct current windings for varying their reactance value and control means for said motor windings and said reactors providing for connection of said reactors in circuit with said motor windings selectively, said means including means to exclude said reactors from circuit at a given speed of said motor following a given excitation of the direct current windings of said reactors and to reinclude said reactors at a maximum value for slow down of said motor, the last mentioned means thereafter exciting the direct current windings of said reactors.

9. The combination with an alternating current motor having a relatively low speed winding and a relatively high speed winding for connection in circuit selectively, of reactors having direct current windings for varying their reactance value and control means for said motor to connect said motor windings in circuit progressively, subjecting each to influence by said reactors and excluding said reactors from circuit following connection of said high speed winding, said means being operable to disconnect said high speed motor winding and to reconnect said low speed motor winding and including means to re-establish connections for said reactors whereby said low speed motor winding is first subjected to the influence of said reactors at maximum reactance value, and whereby the direct current windings of said reactors are then excited for graduated slow down of said motor.

10. The combination with an alternating current motor having a plurality of windings for connection in circuit selectively to afford different speeds, of reactors having direct current windings for varying their reactance value and control means for said motor affording reversals thereof and establishment of circuits for said motor windings selectively, said control means including means to connect said reactors in circuit with said motor windings selectively for acceleration of said motor and for connecting said reactors in circuit with the lower speed winding of said motor for gradual slow down of said motor when subjected to reversals.

11. The combination with an alternating current motor having a plurality of windings for connection in circuit selectively to afford different speeds, of reactors having direct current windings for varying their reactance value and control means for said motor affording reversals thereof and establishment of circuits for said motor windings selectively, said control means including means to connect said reactors in circuit with said motor windings selectively for acceleration of said motor and for connecting said reactors in circuit with the lower speed winding of said motor for gradual slow down of said motor when subjected to reversals, the aforementioned control means providing for differentiation of the reactance value of said reactors when the motor circuit is first completed and the reactance value of said reactors when the low speed motor winding is initially connected for slow down of said motor and further providing in both cases for decreasing the reactance value of said reactors by excitation of their direct current windings.

12. The combination with an alternating current motor having a plurality of windings for connection in circuit selectively to afford different speeds, of reactors having direct current windings for varying their reactance value and control means for said motor windings and said reactors providing for connection of said reactors in circuit with said motor windings selectively, the control means for said reactors including resistance, means to complete circuit for the direct current windings of said reactors inclusive of said resistance preparatory to starting of said motor, means responsive following establishment of starting connections to complete circuit for said direct current windings exclusive of said resistance and means responsive following connection of the higher speed motor winding to shunt said reactors and to effect interruption of the aforementioned circuits of said direct current windings.

13. The combination with an alternating current motor having a plurality of windings for connection in circuit selectively to afford different speeds, of reactors having direct current windings for varying their reactance value and control means for said motor windings and said reactors providing for connection of said reactors in circuit with said motor windings selectively, the control means for said reactors providing for partial excitation of the direct current windings of said reactors preparatory to starting of said motor and further excitation of said direct current windings following establishment of starting connections and the control means for said reactors comprising means to shunt said reactors and effect disconnection of said direct current windings following connection of the higher speed motor winding and means for reconnecting said reactors at maximum reactance value in circuit with said motor for slow down and for again reconnecting said direct current windings of said reactors for control of slow down.

14. The combination with an alternating current motor having a plurality of windings for connection in circuit selectively to afford different speeds, of reactors having direct current windings for varying their reactance value and control means for said motor windings and said reactors providing for connection of said reactors in circuit with said motor windings selectively, the control means for said reactors including resistance, means for completing circuit for said direct current windings either inclusive or exclusive of said resistance, means to shunt said reactors and means whereby the two last mentioned means are controlled to provide for gradual accelerating of said motor through the medium of said reactors starting with a reactance value of less than maximum and for gradual deceleration of said motor through the medium of said reactors starting with a maximum reactance value.

EDWIN W. SEEGER.
EIVIND U. LASSEN.